Patented Dec. 16, 1930

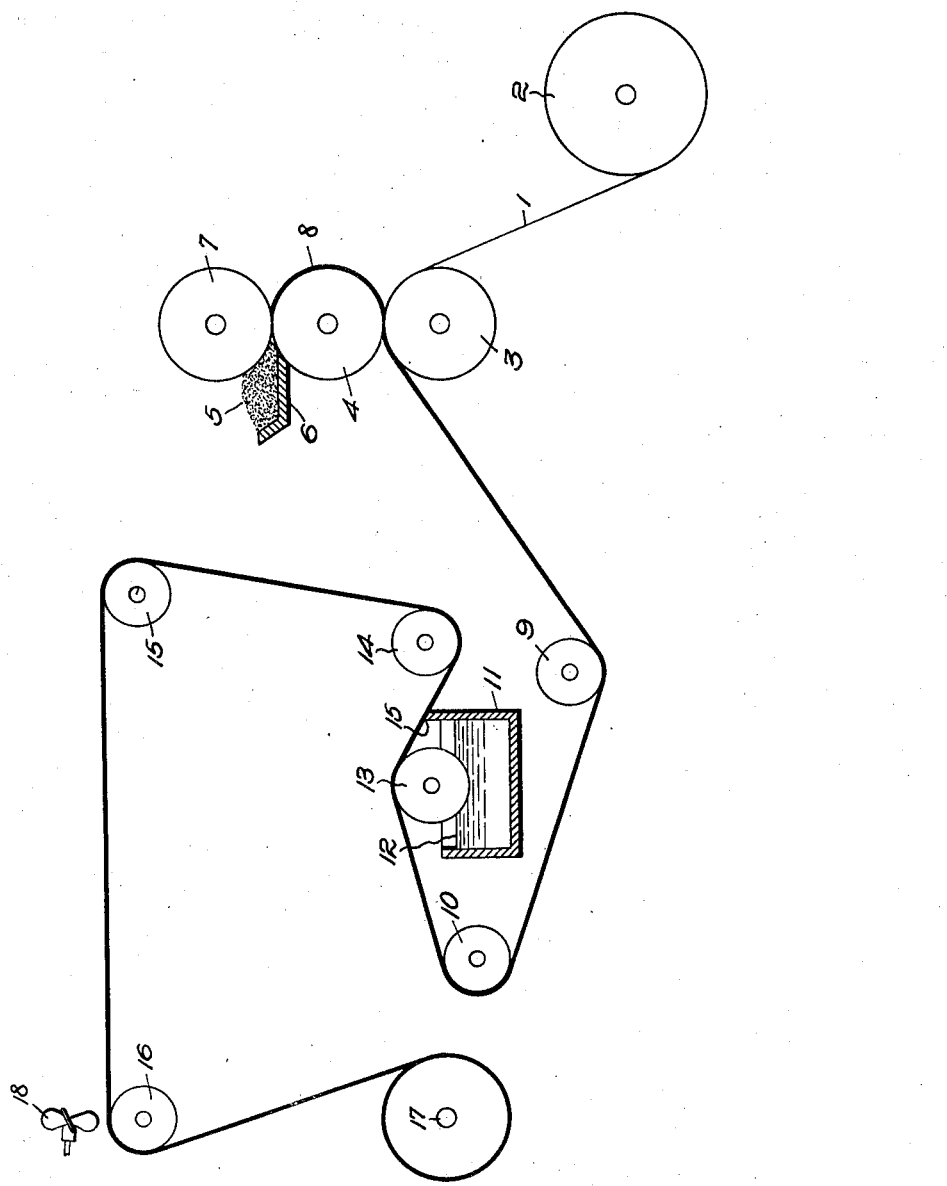

1,785,084

UNITED STATES PATENT OFFICE

HANS RICHARD HAERTEL, OF WRENTHAM, MASSACHUSETTS, ASSIGNOR TO THOMAS H. DUMPER, TRUSTEE, OF NEWTON, MASSACHUSETTS

RUBBER ARTICLES AND METHOD OF PRODUCING THE SAME

Application filed January 13, 1928. Serial No. 246,616.

My invention relates to rubber coated articles and to a process of making the same, particularly but not exclusively rubber coated textile sheets, as for example material for use in making raincoats or the like.

The invention will be best understood from the following description of an example of an article made according to the invention and of one example of the practice of the improved process, while the scope of the invention will be more particularly pointed out in the appended claims.

The drawing shows diagrammatically a calendering machine and auxiliary apparatus for forming rubber coated textile sheets having a coating of lacquer on the surface of the rubber.

Referring to the drawing a sheet 1 of textile material, such as cotton cloth, is fed from a roll 2 and passed between the lower roll 3 and intermediate roll 4 of a calendering machine. A mass 5 of suitably colored and prepared rubber may be placed on the shelf 6 and fed to pass between the upper roll 7 and intermediate roll 4 to form a thin layer of rubber 8 which adheres to the surface of the intermediate roll and passes between the latter and the lower roll with the textile sheet, whereby the layer 8 of rubber is caused to adhere to the latter.

Conveniently the calendering rolls may be heated to facilitate the above described operation, such heat aided by the squeezing action of the rolls on the rubber causing the latter to become sticky or tacky. It has been found that the stickiness of the rubber continues to exist even after the rubber becomes cold, which stickiness if not eliminated will prevent handling of the product during subsequent operations thereon.

According to prior practices the surface of the rubber after the sheet leaves the rolls of the calendering machine is treated to eliminate the superficial stickiness or tackiness of the rubber, after which the sheet is removed from the calendering machine and afterward varnished with a shellac solution for improving its appearance and rendering it suitable for use in fabricated articles therefrom. According to these prior practices the stickiness or tackiness of the rubber surface is eliminated by dusting or brushing said surface with finely powdered clay or like material, or by treating said surface with a halogen such as bromine dissolved in carbon tetrachloride.

Both of the above mentioned ways of eliminating the stickiness or tackiness of the rubber surface have been found objectionable in practice. It has been found impossible to apply the powdered clay with such uniformity, or to cause the clay to so adhere to the surface of the rubber, as will prevent a streaked appearance of the varnished product. Furthermore the use of clay causes the air of the room housing the calendering machine to become filled with fine dust which acts to impair the efficiency of the operators. Further such dust becomes distributed by drafts throughout the various rooms and buildings constituting the plant, causing the various rubber products manufactured therein to become specked with the dust. A result of the use of powdered clay therefore is seriously to impair both the quality of the various products produced by the plant and the efficiency of the operators.

It has been found that the use of bromine and carbon tetrachloride for eliminating the stickiness of the rubber surface results in an inferior product, for the bromine reacts with the rubber to form chemical combinations containing bromine and oxygen, and therefore acts to eliminate the stickiness of the rubber by destroying the surface of the same in respect to its being rubber. This initial oxidization of the rubber surface by the bromine results in time in deeper penetration of the oxidized layer, with consequent shorter life of the product. Further the use of bromine and carbon tetrachloride results in the production of dangerous and disagreeable fumes interfering with the efficiency of the operators.

According to the present invention, the elimination of the stickiness or tackiness of the product and the coating of the same with lacquer such as shellac are effected by one operation without the use of objectionable dust forming substances or oxidization of the rubber, thereby eliminating the disadvantages of the prior methods, securing an improved product, and effecting a saving in labor costs and apparatus.

Referring to the drawing the rubber coated sheet after it passes between the rolls of the calendering machine is guided over rolls 9 and 10 to a tank 11 containing a liquid coating substance, the level of which liquid is indicated at 12.

As shown the tank 11 has a roller 13 pivoted above it, the lower portion of the roller extending to beneath the level of the liquid in the tank. The sheet is guided over the tank in contact with the roller 13 by means of the pulley 10 and a second pulley 14, the surface of the rubber contacting the pulley 13. The passage of the sheet over the tank causes the roller 13 to revolve and coat the rubber surface with the liquid from the tank, the liquid being spread and the excess thereof being scraped off the rubber surface by the edge 15 which contacts said surface co-extensive with its width.

As an example of the coating liquid, but without limitation thereto, the same may contain a suitable lacquer and a mineral substance both dissolved in a substantially volatile solvent, the mineral preferably, but not necessarily, being one that will form minute crystals or other particles upon drying of the solution. For example, the coating liquid may consist of shellac dissolved in methyl alcohol plus a metal carbonate, such as zinc carbonate, dissolved in ammonia. I have found that the exact proportions of these substances should be varied to suit the desired thickness of the film of lacquer and the desired glossiness of its surface, but for average conditions a solution consisting of 20 gallons methyl alcohol, 20 pounds shellac, 2 gallons ammonia, and 1 pound zinc carbonate will give satisfactory results. The alcohol and ammonia of this liquid rapidly evaporate to cause drying of the film of coating substance, resulting in a film of shellac having distributed therethrough minute, transparent, colorless and substantially invisible particles which act to dull the surface of the shellac to give it a pleasing appearance and to harden the same to prevent it being scuffed or scratched, while eliminating all stickiness or tackiness of the surface.

As shown in the drawing the sheet of material after leaving the roll 14 is passed over rolls 15 and 16 and wound on an arbor 17. Conveniently a fan 18 may be provided for projecting the blast of air along the length of sheeting between the rolls 15 and 16 to cause drying of the coating, which drying is aided by the fact that the sheeting after it leaves the rolls is somewhat warm.

It has been proposed to harden and dull the surface of a shellac coating on rubber coated textiles, after the shellac has dried, by use of bromine dissolved in carbon tetrachloride, with the result that not only are the operators exposed to highly disagreeable and dangerous fumes, but an inferior product is produced. It has been found that the shellac coating is broken in the form of microscopic cracks which expose the surface of the rubber to the action of the bromine, which as heretofore explained attacks the rubber by an oxidizing action, causing gradual deterioration of the rubber.

It will be observed that the present process is distinguished from prior processes in that among other things the rubber surface is varnished and the stickiness of the product eliminated by use of substances substantially inert with respect to rubber and with avoidance of dust and fumes affecting the health of the operators.

In cases where it is desired to apply several coatings of rubber to the textile sheet by progressively passing the same through the rolls of calendering machines the shellac and alcohol may be omitted from the treating solution for all except the last coat of rubber applied, thereby causing the rubber surface to be coated with a film of minute crystals of the mineral substance which will eliminate the tackiness of the rubber surface and permit the product to be handled. However, if desired, this solution may contain a small quantity of alcohol to facilitate drying.

It will be understood that the above described apparatus and materials, and the particular steps of the method described, are illustrative only, and that wide deviations may be made from these within the scope of the invention without departing from its spirit.

Claims:

1. That improvement in the method of producing rubberized textile sheets which consists in coating the rubber surface while tacky with shellac and zinc carbonate dissolved in a mixture of alcohol and ammonia, and drying the coating.

2. That improvement in the method of producing rubberized textile sheets which comprises applying a rubber coating to the sheet by use of hot calendering rolls, and, upon the warm sheet leaving the rolls, coating the tacky rubber surface with a liquid lacquer having a shellac body dissolved in alcohol and zinc carbonate dissolved in ammonia, and drying the lacquer so applied.

3. An article of manufacture comprising a rubber coated textile sheet, the surface of the rubber having a coating of material comprising shellac mixed with finely divided, uniformly distributed, substantially invisible zinc carbonate.

In testimony whereof, I have signed my name to this specification.

HANS RICHARD HAERTEL.